United States Patent
Koul et al.

(10) Patent No.: US 9,922,095 B2
(45) Date of Patent: Mar. 20, 2018

(54) AUTOMATED CLOSED CAPTIONING USING TEMPORAL DATA

(71) Applicant: Microsoft Technology Licensing, LLC, Redmond, WA (US)

(72) Inventors: Anirudh Koul, Sunnyvale, CA (US); Ranjitha Gurunath Kulkarni, Sunnyvale, CA (US); Serge-Eric Tremblay, San Jose, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 462 days.

(21) Appl. No.: 14/728,201

(22) Filed: Jun. 2, 2015

(65) Prior Publication Data
US 2016/0357746 A1 Dec. 8, 2016

(51) Int. Cl.
| | |
|---|---|
| G06F 7/00 | (2006.01) |
| G06F 17/30 | (2006.01) |
| G10L 15/26 | (2006.01) |
| G10L 15/183 | (2013.01) |
| G06F 17/27 | (2006.01) |
| H04N 21/488 | (2011.01) |

(52) U.S. Cl.
CPC ........ G06F 17/3053 (2013.01); G06F 17/278 (2013.01); G06F 17/30867 (2013.01); G10L 15/183 (2013.01); G10L 15/26 (2013.01); H04N 21/4888 (2013.01)

(58) Field of Classification Search
None
See application file for complete search history.

(56) References Cited

U.S. PATENT DOCUMENTS

| | | | |
|---|---|---|---|
| 6,076,088 A * | 6/2000 | Paik | ................... G06F 17/30707 |
| 6,816,858 B1 * | 11/2004 | Coden | ............... G06F 17/30855 |
| | | | 386/241 |
| 7,747,434 B2 | 6/2010 | Flanagan et al. | |

(Continued)

OTHER PUBLICATIONS

"International Search Report and Written Opinion Issued in PCT Application No. PCT/US2016/035127", dated Aug. 26, 2016, 12 Pages.

(Continued)

*Primary Examiner* — Uyen Le
(74) *Attorney, Agent, or Firm* — The Watson IP Group, PLC; Vladan M. Vasiljevic

(57) ABSTRACT

One or more systems and/or techniques are provided for automatic closed captioning for media content. In an example, real-time content, occurring within a threshold timespan of a broadcast of media content (e.g., social network posts occurring during and an hour before a live broadcast of an interview), may be accessed. A list of named entities, occurring within the social network data, may be generated (e.g., Interviewer Jon, Interviewee Kathy, Husband Dave, Son Jack, etc.). A ranked list of named entities may be created based upon trending named entities within the list of named entities (e.g., a named entity may be ranked higher based upon a more frequent occurrence within the social network posts). A dynamic grammar (e.g., library, etc.) may be built based upon the ranked list of named entities. Speech recognition may be performed upon the broadcast of media content utilizing the dynamic grammar to create closed caption text.

20 Claims, 8 Drawing Sheets

(56) References Cited

U.S. PATENT DOCUMENTS

| | | | |
|---|---|---|---|
| 8,014,765 | B2 | 9/2011 | Pettinato |
| 8,311,832 | B2 | 11/2012 | Miyamoto et al. |
| 2012/0316882 | A1 | 12/2012 | Fiumi |
| 2013/0242114 | A1 | 9/2013 | Polumbus et al. |
| 2013/0291008 | A1 | 10/2013 | Abed |
| 2014/0081636 | A1 | 3/2014 | Erhart et al. |
| 2014/0088961 | A1 | 3/2014 | Woodward et al. |
| 2014/0156271 | A1 | 6/2014 | Gammon |
| 2016/0049146 | A1* | 2/2016 | Chang .................. G10L 15/063 704/235 |

OTHER PUBLICATIONS

Munteanu, et al., "Web-Based Language Modelling for Automatic Lecture Transcription", In Proceedings of Tenth European Conference on Speech Communication and Technology—EuroSpeech/Eighth Interspeech, Aug. 1, 2007, 4 Pages.

Saykham, et al., "Online Temporal Language Model Adaptation for a Thai Broadcast News Transcription System", In Proceedings of Seventh International Conference on Language Resources and Evaluation (LREC), May 19, 2010, pp. 1690-1694.

Schlippe, et al., "Unsupervised Language Model Adaptation for Automatic Speech Recognition of Broadcast News Using Web 2.0", In Proceedings of 14th Annual Conference of the International Speech Communication Association, Interspeech 2013, Aug. 1, 2013, 22 Pages.

Wilhelm-Stein, et al., "Improving Transcript-Based Video Retrieval Using Unsupervised Language Model Adaptation", In Proceedings of 5th International Conference of the CLEF Initiative, Sep. 15, 2014, pp. 110-115.

Oku, et al., "Progressive Language Model Adaptation for Disaster Broadcasting with Closed-captions", In Annual Summit and Conference on Signal and Information Processing Association, Oct. 29, 2013, 6 pages. http://www.apsipa.org/proceedings_2013/papers/94_Progressive-Language-Oku-2938727.pdf.

"Live Closed Captioning", Published on: Dec. 25, 2012, pp. 4, Available at: http://www.cpcweb.com/live/Steno_machine_vs_Speech_recognition.htm.

"Closed Captioning Standards and Protocol for Canadian English Language Television Programming Services", Published on: Dec. 2008, pp. 28, Available at: http://www.cab-acr.ca/english/social/captioning/captioning.pdf.

Ohno, et al., "Simultaneous Summarization of Japanese Spoken Monologue for Real-time Captioning", In International Conference on Natural Language Processing and Knowledge Engineering, Aug. 30, 2007, 8 pages, http://ieeexplore.ieee.org/xpl/articleDetails.jsp?tp=&arnumber=4368058&queryText%3Dreal-time+speech+recoginition+captioning.

Boulianne, et al., "Real-Time Speech Recognition Captioning of Events and Meetings", In IEEE Spoken Language Technology Workshop, Dec. 15, 2008, 4 pages, http://ieeexplore.ieee.org/xpl/articleDetails.jsp?tp=&arnumber=4777874&queryText%3DReal-time+speech+recoginition+captioning+of+events+and+meetings.

Coffey, Nicole., "How closed captioning works", Retrieved on: Sep. 15, 2014, pp. 5, Available at: http://frontrow.espn.go.com/2011/10/how-closed-captioning-works/.

\* cited by examiner

AUTOMATED CLOSED CAPTIONING USING TEMPORAL DATA

BACKGROUND

Many content providers, such as television and cable providers, may provide closed captioning for media content such as television programming. A content provider may employ a human to type out closed captioning text while listening to audio of the media content. When an abundance of audio is produced, such as during a live broadcast of a sporting event, multiple humans may be employed to type out closed captioning text of the audio. In this way, a content provider may provide closed captioning, for media content, which comprises a textual transcription of audio of the media content.

SUMMARY

This summary is provided to introduce a selection of concepts in a simplified form that are further described below in the detailed description. This summary is not intended to identify key factors or essential features of the claimed subject matter, nor is it intended to be used to limit the scope of the claimed subject matter.

Among other things, one or more systems and/or techniques for automated closed captioning for media content are provided herein. In an example, a dynamic grammar builder is configured to access real-time content occurring within a threshold timespan of a broadcast of media content. The dynamic grammar builder is configured to generate a list of named entities occurring within the real-time content. The dynamic grammar builder is configured to identify trending named entities within the list of named entities. The dynamic grammar builder is configured to rank the list of named entities based upon the trending named entities to create a ranked list of named entities. The dynamic grammar builder is configured to build a dynamic grammar based upon the ranked list of named entities. A speech recognition component is configured to perform speech recognition upon the broadcast of media content utilizing the dynamic grammar to create closed caption text for the broadcast of media content.

In an example, social network data, occurring within a threshold timespan of a broadcast of media content, is accessed. A list of named entities, occurring within the social network data, is generated. Trending named entities, within the list of named entities, are identified. The list of named entities is ranked based upon the trending named entities to create a ranked list of named entities. A dynamic grammar is built based upon the ranked list of named entities. Speech recognition is performed upon the broadcast of media content utilizing the dynamic grammar to create closed caption text for the broadcast of media content.

In an example, real-time content, occurring within a threshold timespan of a broadcast of media content, is accessed. A list of named entities, occurring within the real-time content, is generated. Trending named entities, within the list of named entities, are identified. The list of named entities is ranked based upon the trending named entities to create a ranked list of named entities. A dynamic grammar is built based upon the ranked list of named entities. The dynamic grammar is used to correct user generated closed captioning for the broadcast of media content.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
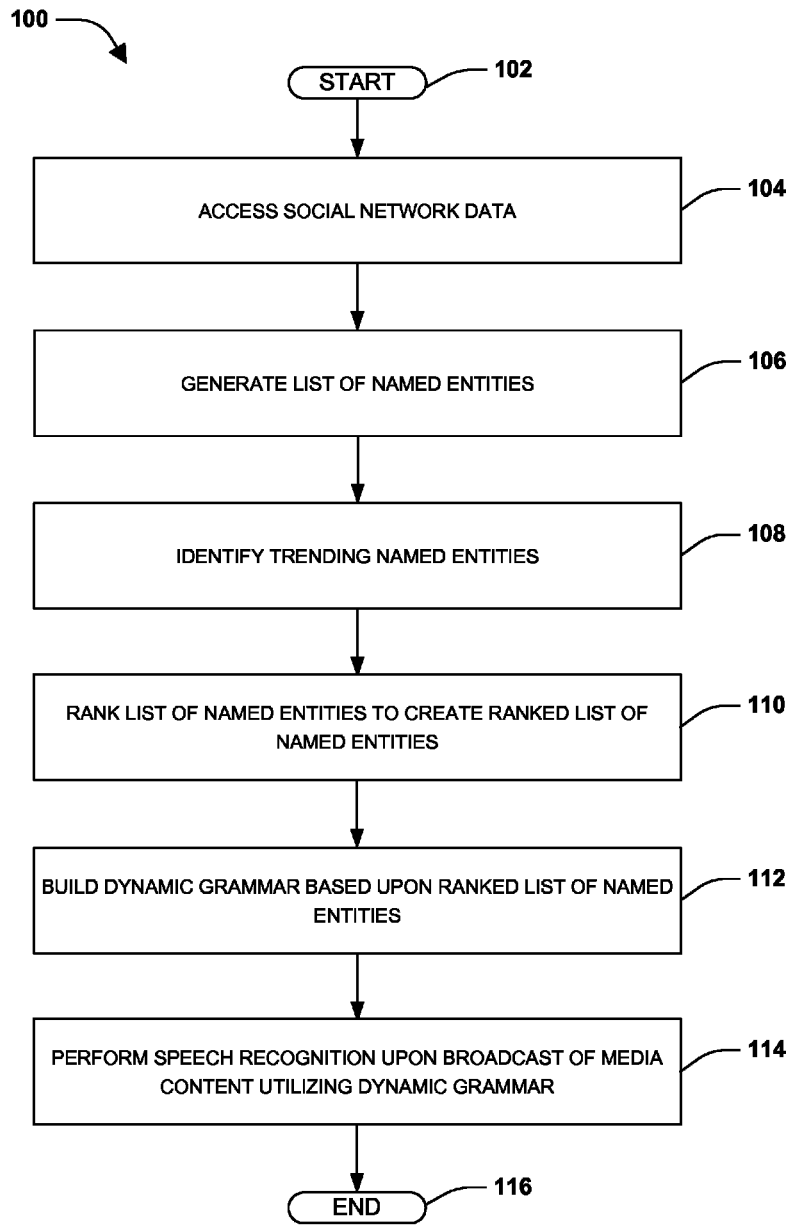
FIG. 1 is a flow diagram illustrating an exemplary method of automated closed captioning for media content.

The claimed subject matter is now described with reference to the drawings, wherein like reference numerals are generally used to refer to like elements throughout. In the following description, for purposes of explanation, numerous specific details are set forth to provide an understanding of the claimed subject matter. It may be evident, however, that the claimed subject matter may be practiced without these specific details. In other instances, structures and devices are illustrated in block diagram form in order to facilitate describing the claimed subject matter.

One or more systems and/or techniques for automated closed captioning for media content are provided herein. Many content providers may attempt to provide relatively accurate closed captioned text for broadcasts of media content (e.g., a television show, a movie, cable programming, audio content such as Internet radio or a live audio stream of an interview, etc.). Employing humans to perform closed captioning can become expensive and/or produce inaccurate results. Certain content, such as live content (e.g., a live broadcast, an online videogame, a live interview, etc.), may be difficult to create closed captioning text from because human closed captioning typers may be unable to keep up with the rate of speech in the live content (e.g., fast commentary between multiple sports announcers). Various nuisances, such as different spellings of a name (e.g., Jon or John; Kathy or Cathy; etc.), new terms (e.g., a name of a new political group previously unknown to human closed captioning typers and/or speech recognition systems), etc., may increase the difficulty in identifying a named entity and/or determining a correct spelling of a named entity (e.g., a business name, a football player's name, etc.). Accordingly, as provided herein, automated closed captioning for media content may be performed based upon named entities identified from real-time content, such as social network data (e.g., social network posts) and/or any other type of data, occurring temporally around a broadcast of media content (e.g., social network post occurring during and/or a few hours before a live Super Bowl broadcast). The real-time content may be used to generate a dynamic grammar (e.g., library, dictionary, thesaurus, etc.) that is used by speech recognition to improve accuracy of identifying named entities spoken within the media content. In this way, relatively more accurate closed captioning text may be generated for live content utilizing the dynamic grammar that may otherwise be too difficult for a human closed captioning typer. Costs associated with human closed captioning typers may be avoided or mitigated as human closed captioning typers may not be needed or may be needed to a lesser degree pursuant to the automated closed captioning provided herein. Closed captioning as provided herein may be performed more quickly and/or efficiently as compared to human closed captioning typers because automated (e.g., programmatic, computerized, etc.) closed captioning may be generated faster than human typers can type. Bandwidth and/or other computing resources may be conserved pursuant the automated closed captioning provided herein. For example, at least some automated closed captioning may be performed locally on a device upon which closed caption text is displayed so that at least some of the closed caption text does not need to be transmitted. In an example, dynamic grammar may be stored on the device (e.g., and periodically updated), and the device may locally use the dynamic grammar to generate, correct, supplement, etc. closed caption text. In an example, at least some automated closed captioning may be performed locally on a device that acquires and/or broadcasts content from which closed caption text is generated so that fewer computing resource are consumed on devices to which the closed caption text is transmitted and/or upon which the closed caption text is displayed.

An embodiment of automated closed captioning for media content is illustrated by exemplary method 100 of FIG. 1. At 102, the method starts. A content provider may broadcast media content to users through various mediums, such as an online game through a computing device, a live broadcast through a cable receiver, an interview through a video app on a mobile device, a video through a wearable device, etc. In an example, users may discuss or identify various aspects of the live broadcast, leading up to, during, and/or after the live broadcast, through social networks and/or other real-time content (e.g., query logs, forum posts, social network posts, microblog messages, and/or other user created data updated in real-time). For example, before, during, and/or after a live broadcast (e.g., a Super Bowl, a presidential speech, a live interview, live television programming, etc.), users may blog, microblog, post, etc. about the live broadcast.

At 104, social network data (e.g., and/or other real-time content), occurring within a threshold timespan of a broadcast of media content, may be accessed. For example, social network posts, created during and/or within 3 days before a live broadcast of an Olympic event, may be obtained in real-time during the live broadcast. In an example, the social network data may be filtered based upon a context of an event occurring within the media content (e.g., non-sports related social network posts may be filtered from the social network data; social network data with profanity may be filtered out because the Olympic event may be deemed to be a family oriented event as opposed to an adult themed event where such profanity may not be filtered out). In an example, the threshold timespan may be defined based upon a type of event occurring within the media content (e.g., the threshold timespan may span from 3 days before the Olympic event until a current time, whereas a threshold timespan for a breaking news plane crash interview may be set to an hour or less before the plane crash because any social network data more than an hour prior to the plane crash may have little to no relevance to the plane crash (e.g., because social network users would not have been discussing the plane crash before it occurred)).

At 106, a list of named entities, occurring within the social network data (e.g., and/or other real-time content), may be generated. For example, entity recognition functionality may be executed upon the social network data to identify named entities (e.g., a business, a location, a person, a consumer good, etc.). In an example, occurrence metrics may be determined for named entities (e.g., a number of times a named entity occurred within the social network data). At 108, trending named entities, within the list of named entities, may be identified. For example, the occurrence metrics may be evaluated within trending timespan thresholds (e.g., a timespan indicating a spike in named entity usage) to identify the trending named entities (e.g., an Olympic speed skater, performing during the Olympic event, may be discussed at an increased rate during the Olympic event).

At 110, the list of named entities may be ranked based upon the trending named entities to create a ranked list of named entities (e.g., trending and/or more frequently occurring named entities may be ranked higher in the ranked list of named entities). In an example, supplemental content, associated with a named entity within the list of named entities, may be accessed (e.g., previous commentary by the Olympic speed skater that is participating in the Olympic event; a transcript of previous commentary for a similar Olympic event; etc.). The supplemental content may be evaluated to identify a context associated with at least one of the named entity or an event occurring within the media content (e.g., a determination that the Olympic event is an Olympic speed skating event).

At 112, a dynamic grammar is built based upon the ranked list of named entities and/or the supplemental content. The dynamic grammar may be formatted according to a lookup library/dictionary (e.g., formatted as a speech recognition grammar specification file, such as a GRXML file used as input into a speech recognition component) against which a speech recognition component may compare audio fragments of the broadcast of media content. The dynamic grammar may specify a probability weight for a named entity (e.g., a probability, derived from a rank of the named entity within the ranked list of named entities, that the named entity may occur within an audio fragment of the broadcast), which may be used by the speech recognition component to retain, increase, or decrease a probability that an audio fragment of the broadcast corresponds to the named entity.

At 114, speech recognition may be performed upon the broadcast of media content utilizing the dynamic grammar to create closed caption text for the broadcast of media content. The speech recognition may utilize an acoustic model (e.g., a deep neural network) and/or a language model (e.g., the dynamic grammar and/or a universal language model) for speech recognition. The dynamic grammar may be utilized by speech recognition functionality to increase a probability (e.g., an audio fragment may be identified as potentially matching a relatively high ranked named entity within the dynamic grammar), decrease the probability (e.g., an audio fragment may not match a named entity within the dynamic grammar), or retain the probability that the audio fragment, of the broadcast of media content, is a named entity. In an example of utilizing the dynamic grammar, the dynamic grammar may be loaded into memory of a speech recognition server. Speech recognition functionality, hosted by the speech recognition server, may be invoked to utilize the dynamic grammar as a library against which an audio fragment, of the broadcast of media content, is compared to determine (e.g., or modify) a probability that the audio fragment is a named entity.

Because the social network data and/or the real-time content may occur contemporaneously with a live broadcast, relatively up-to-date information within the dynamic grammar may be used by speech recognition functionality. For example, responsive to a refresh event occurring (e.g., availability of updated social network data; expiration of a timer; identification of new trending named entities, etc.), the list of named entities may be re-ranked based upon named entity occurrences within updated social network data, and the dynamic grammar may be updated based upon the re-ranked list of named entities.

In an example, the dynamic grammar may be utilized to correct user generated closed captioning for the broadcast of media content. For example, closed captioning text, within the user generated closed captioning, may be cross referenced with the dynamic grammar to determine whether a named entity within the closed captioning text occurs within the dynamic grammar. If the named entity does not occur within the dynamic grammar, then the named entity may be edited based upon a closest matching named entity within the dynamic grammar (e.g., "Kathy", within the closed captioning text, may be changed to "Cathy" occurring within the dynamic grammar). At 116, the method ends.

Figure 2A:
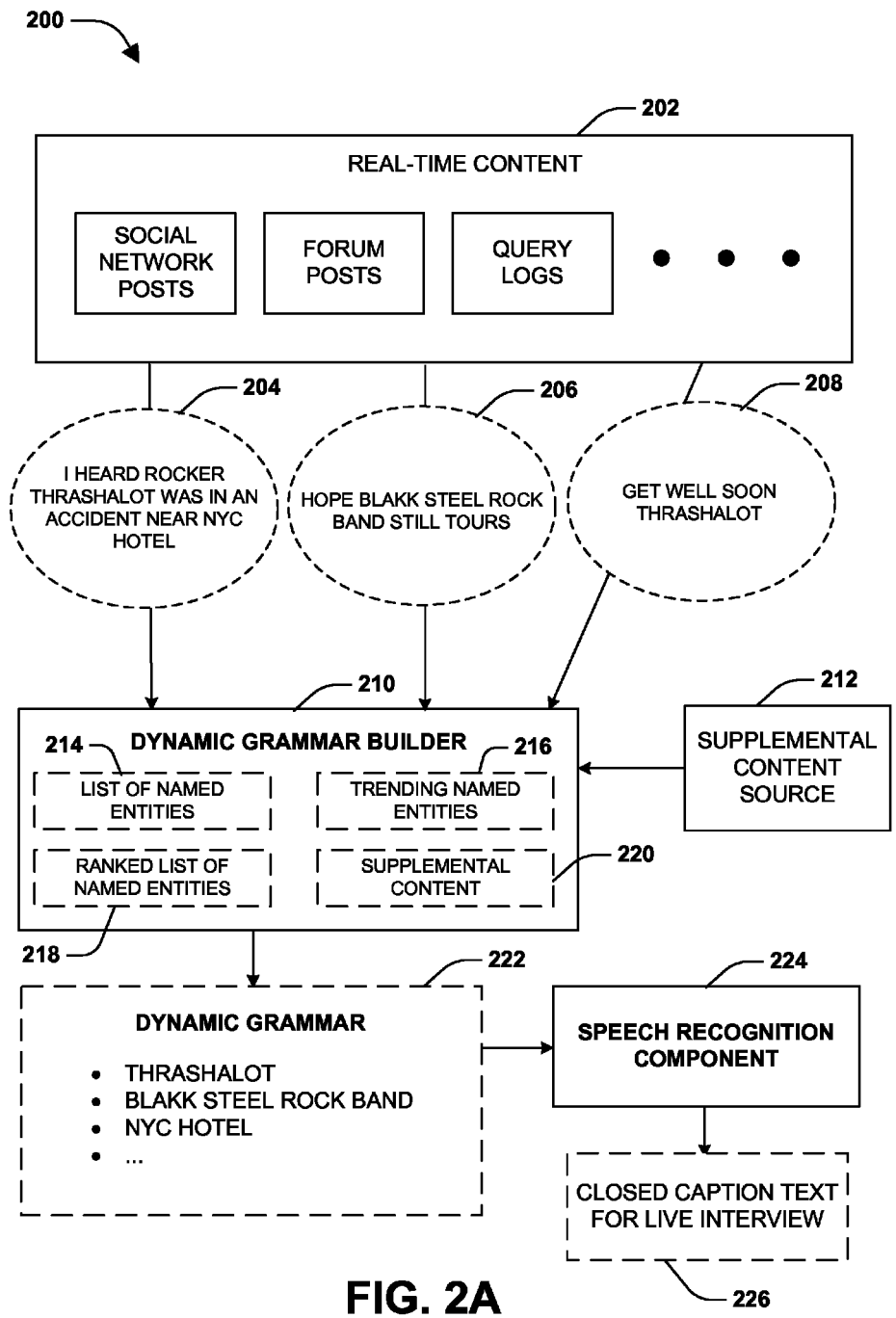
FIG. 2A is a component block diagram illustrating an exemplary system for automated closed captioning for media content.
Figure 2B:
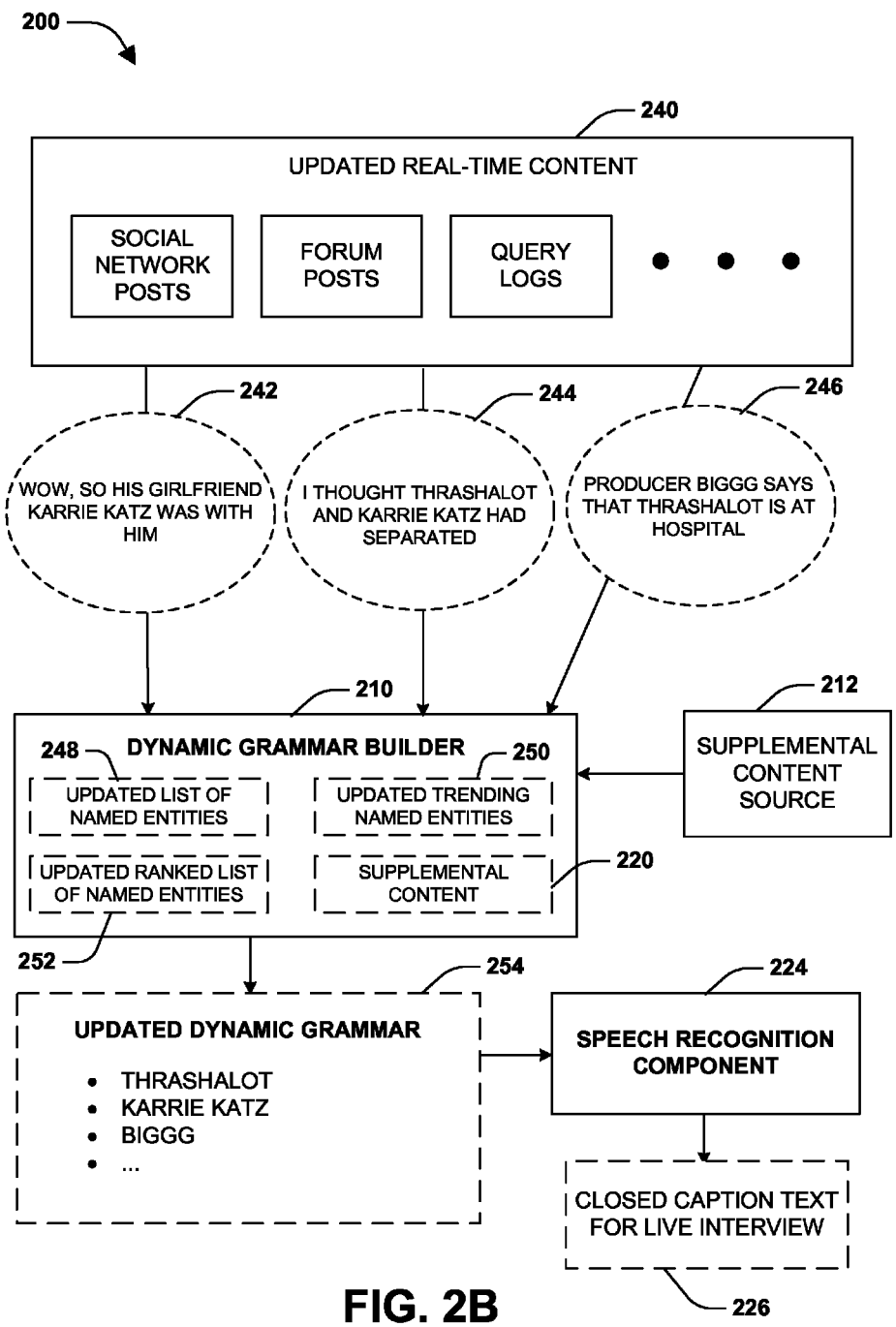
FIG. 2B is a component block diagram illustrating an exemplary system for automated closed captioning for media content, where an updated dynamic grammar is created and utilized for closed captioning.

FIGS. 2A-2B illustrate examples of a system 200, comprising a dynamic grammar builder 210 and/or a speech recognition component 224, for automated closed captioning for media content. In an example, the media content may correspond to a broadcast of a live interview regarding an automobile accident involving Rocker Thrashalot, a band member of Blakk Steel Rock Band, that occurred an hour before the live interview. FIG. 2A illustrates the dynamic grammar builder 210 accessing real-time content 202, such as social network posts, forum posts, query logs, and/or other user created data that is updated in real-time, that occurred within a threshold timespan of the live interview (e.g., real-time content created during the live interview and within an hour of the live interview). For example, a first social network post 204 "I heard Rocker Thrashalot was in an accident near NYC hotel", a second social network post 206 "Hope Blakk Steel Rock Band still tours", a third social network posts 208 "Get Well Soon Thrashalot", and/or other social network posts may be selected from the real-time content 202.

The dynamic grammar builder 210 may generate a list of named entities 214 occurring within the real-time content 202. For example, the list of named entities may comprise Thrashalot, Blakk Steel Rock Band, NYC Hotel, Drummer Dave, Producer Biggg, Witness Sally, etc. The dynamic grammar builder 210 may identify trending named entities 216, such as Thrashalot and Blakk Steel Rock Band, corresponding to named entities having an increased occurrence within a trending timespan threshold (e.g., a spike or burst in occurrence). The dynamic grammar builder 210 may rank the list of named entities 214 based upon the trending named entities 216 to create a ranked list of named entities 218 (e.g., trending named entities and/or named entities having a high occurrence may be ranked higher than non-trending named entities and/or named entities having a low occurrence). The dynamic grammar builder 210 may obtain supplemental content 220 from a supplemental content source 212 (e.g., a transcript of a previous news segment about the Blakk Steel Rock Band).

The dynamic grammar builder 210 may build a dynamic grammar 222 based upon the ranked list of named entities 218. The dynamic grammar 222 may be used as a lookup library/dictionary by the speech recognition component 224 in order to determine probabilities that audio fragments of the live interview correspond to named entities. For example, the dynamic grammar 222 may be formatted as a speech recognition grammar specification file, such as a GRXML file, used as input into the speech recognition component 224. In an example, the dynamic grammar 222 may specify a probability weight for a named entity (e.g., Thrashalot may have a highest probability weight due to having a highest rank within the ranked list of named entities 218; Blakk Steel Rock Band may have a second highest probability weight due to having a second highest rank within the ranked list of named entities 218, etc.), which may be used by the speech recognition component 224 to retain, increase, or decrease a probability that an audio fragment corresponds to the named entity. Closed caption text 226 may be generated for the live interview by the speech recognition component 224 utilizing the dynamic grammar 222. The closed caption text 226 may be relatively more accurate than closed captioning by a human closed captioning typer and/or by speech recognition functionality not using the dynamic grammar 222 because the human closed captioning typer and/or the speech recognition functionality may not understand how to spell Thrashalot and Blakk Steel Rock Band.

FIG. 2B illustrate the dynamic grammar builder 210 dynamically updating the dynamic grammar 222 during the live interview. For example, the dynamic grammar builder 210 may determine that updated real-time content 240 is available. The dynamic grammar builder 210 may select a fourth social network post 242 "Wow, his girlfriend Karrie Katz was with him", a fifth social network post 244 "I thought Thrashalot and Karrie Katz had separated", a sixth social network post 246 "producer Biggg says that Thrashalot is at hospital", etc. The dynamic grammar builder 210 may update the list of named entities 214 based upon the updated real-time content 240 to create an updated list of named entities 248. The dynamic grammar builder 210 may identify updated trending named entities 250, such as Thrashalot and Karrie Katz, corresponding to named entities having an increased occurrence within a trending timespan threshold (e.g., a spike or burst in occurrence). The dynamic grammar builder 210 may rank the updated list of named entities 248 based upon the updated trending named entities 250 to create an updated ranked list of named entities 252 (e.g., trending named entities and/or named entities having a high occurrence may be ranked higher than non-trending named entities and/or named entities having a low occurrence).

The dynamic grammar builder 210 may update the dynamic grammar 222 based upon the updated ranked list of named entities 252 to create an updated dynamic grammar 254 (e.g., during the live interview). The speech recognition component 224 may utilize the updated dynamic grammar 254 for creating the closed caption text 226 for the live interview. In this way, up-to-date user created real-time content may be used to improve accuracy of the speech recognition component 224 (e.g., so that "Karrie Katz" is less likely to be misspelled as "Carrie Cats" in the closed caption text).

Figure 3:
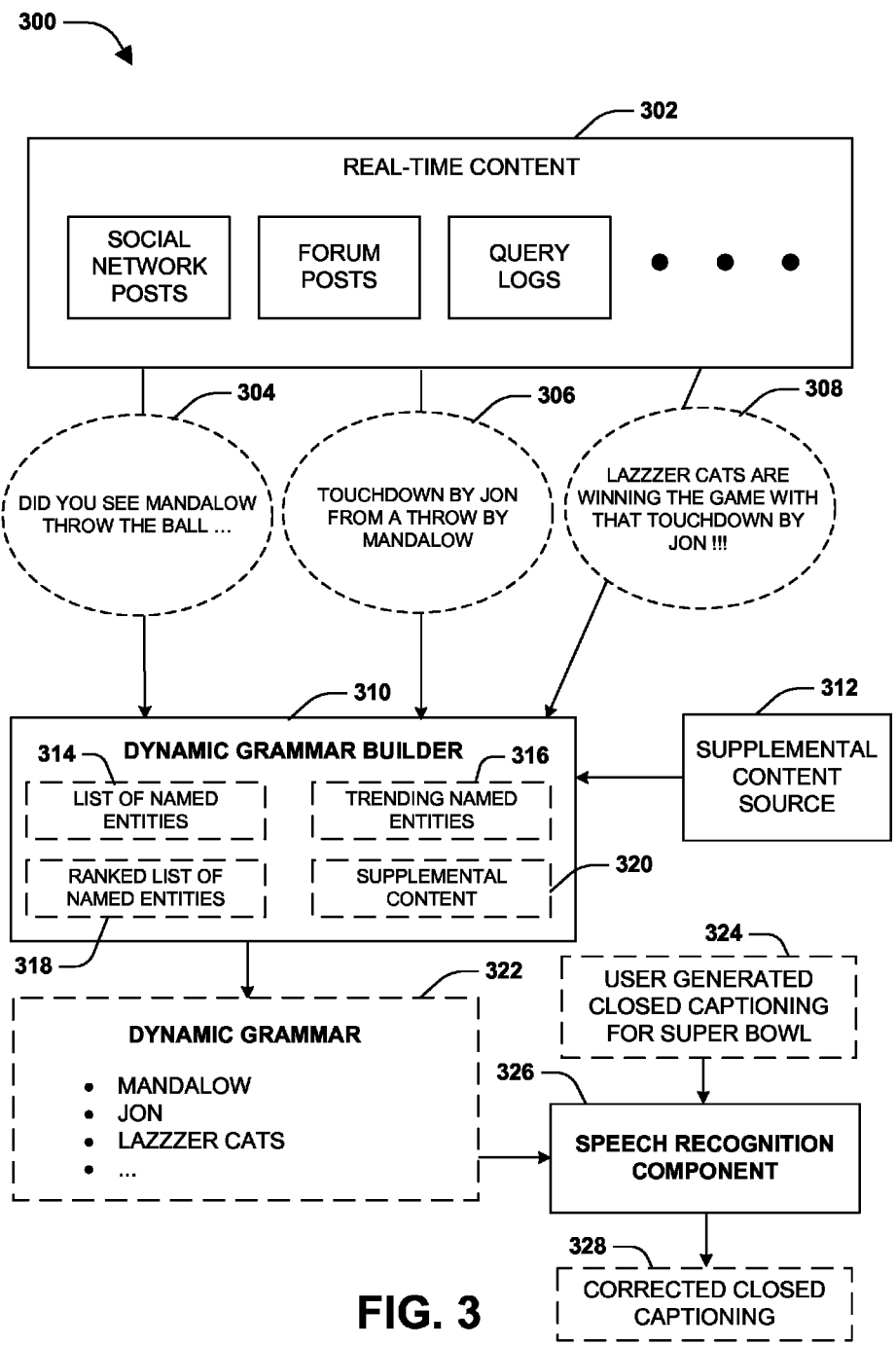
FIG. 3 is a component block diagram illustrating an exemplary system for improving closed captioning for media content.

FIG. 3 illustrates an example of a system 300, comprising a dynamic grammar builder 310 and/or a speech recognition component 326, for improving closed captioning for media content. In an example, the media content may correspond to a live broadcast of a Super Bowl event. One or more human closed captioning typers may generate user generated closed captioning 324 for the live broadcast of the Super Bowl event. Because the Super Bowl event is a live broadcast, the user generated closed captioning 324 may comprise errors (e.g., misspellings of named entities, missed words, etc.), and thus a dynamic grammar 322 may be built to correct the user generated closed captioning 324.

The dynamic grammar builder 310 may access real-time content 302, such as social network posts, forum posts, query logs, and/or other user created data that is updated in real-time, that occurred within a threshold timespan of the live broadcast of the Super Bowl (e.g., real-time content created during the live broadcast and within 20 hours before of the live broadcast). For example, a first social network post 304 "Did you see Mandalow throw the ball", a second social network post 306 "Touchdown by Jon from a throw by Mandalow", a third social network posts 308 "Lazzzer Cats are winning the game with that touchdown by Jon!!!!", and/or other social network posts may be selected from the real-time content 302.

The dynamic grammar builder 310 may generate a list of named entities 314 occurring within the real-time content 302. For example, the list of named entities may comprise Mandalow, Jon, Lazzzer Cats, Tigers, Scott Doe, Joe, etc. The dynamic grammar builder 310 may identify trending named entities 316, such as Mandalow, Jon, and Lazzzer Cats, corresponding to named entities having an increased occurrence within a trending timespan threshold (e.g., a spike or burst in occurrence). The dynamic grammar builder 310 may rank the list of named entities 314 based upon the trending named entities 316 to create a ranked list of named entities 318 (e.g., trending named entities and/or named entities having a high occurrence may be ranked higher than non-trending named entities and/or named entities having a low occurrence). The dynamic grammar builder 310 may obtain supplemental content 320 from a supplemental content source 312 (e.g., a transcript of previous coverage of a football game involving the Lazzzer Cats team).

The dynamic grammar builder 310 may build a dynamic grammar 322 based upon the ranked list of named entities 318. The dynamic grammar 322 may be used as a lookup library/dictionary by the speech recognition component 326 in order to correct the user generated closed captioning 324. For example, the user generated closed captioning 324 may misspell Jon's name as John and Lazzzer Cats as Laser Cats. Because John and Laser Cats may not occur within the dynamic grammar 322 (e.g., or the dynamic grammar 322 may specify a relatively low probability weight for such named entity terms), John may be corrected to Jon and Laser Cats may be corrected to Lazzzer Cats based upon the dynamic grammar 322 specifying a relatively high occurrence probability for Jon and for Lazzzer Cats. In this way, the dynamic grammar 322 may be used to create corrected closed captioning 328.

Figure 4:
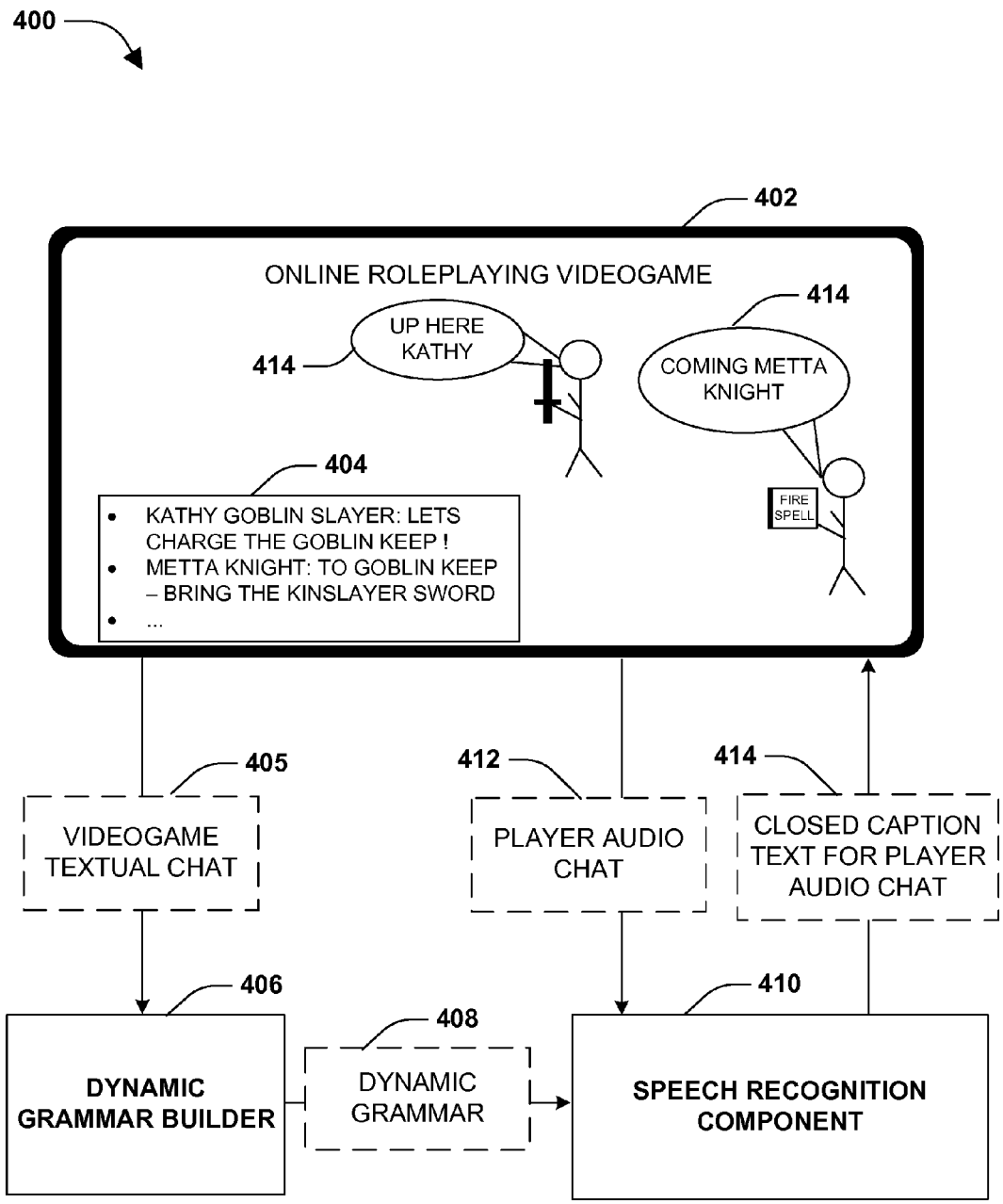
FIG. 4 is a component block diagram illustrating an exemplary system for automated closed captioning for media content, such as a videogame.

FIG. 4 illustrates an example of a system 400, comprising a dynamic grammar builder 406 and/or a speech recognition component 410, for automated closed captioning for media content. In an example, the media content may correspond to an online roleplaying videogame 402 that may be played by various users in real-time. Users may be capable of typing messages to one another through a textual chat interface 404. Users may be capable of speaking with one another, such as through microphones and/or speakers (e.g., a headset). For example, a first user may speak a first statement "up here Kathy" through a first microphone, which may be played as a first audio statement to users of the online roleplaying videogame 402. The second user may speak a second statement "coming Metta Knight" through a second microphone, which may be played as a second audio statement to users of the online roleplaying videogame 402. The online roleplaying videogame 402 may desire to provide audio to text translations for users (e.g., a third user may have the online roleplaying videogame 402 muted, but may still want to receive messages spoken by other users).

Accordingly, the dynamic grammar builder 406 may access real-time content, such as videogame textual chat 405 from the textual chat interface 404 (e.g., in real-time during gameplay of the online roleplaying videogame 402). The dynamic grammar builder 406 may build a dynamic grammar 408 based upon named entities (e.g., Kathy Goblin Slayer, Goblin Keep, Metta Knight, Kinslayer Sword, etc.) occurring and/or trending within the videogame textual chat 405. The speech recognition component 410 may perform speech recognition upon the player audio chat 412, such as the first audio statement and the second audio statement, utilizing the dynamic grammar 408 to create closed caption text 414 for the player audio chat 412. The closed caption text 414 (e.g., "Up here Kathy" and "coming Metta Knight") may be displayed through the online roleplaying videogame 402, such as through chat bubble interfaces associated with avatars of the first user and the second user, as a bottom-screen scroll, etc.

Figure 5:
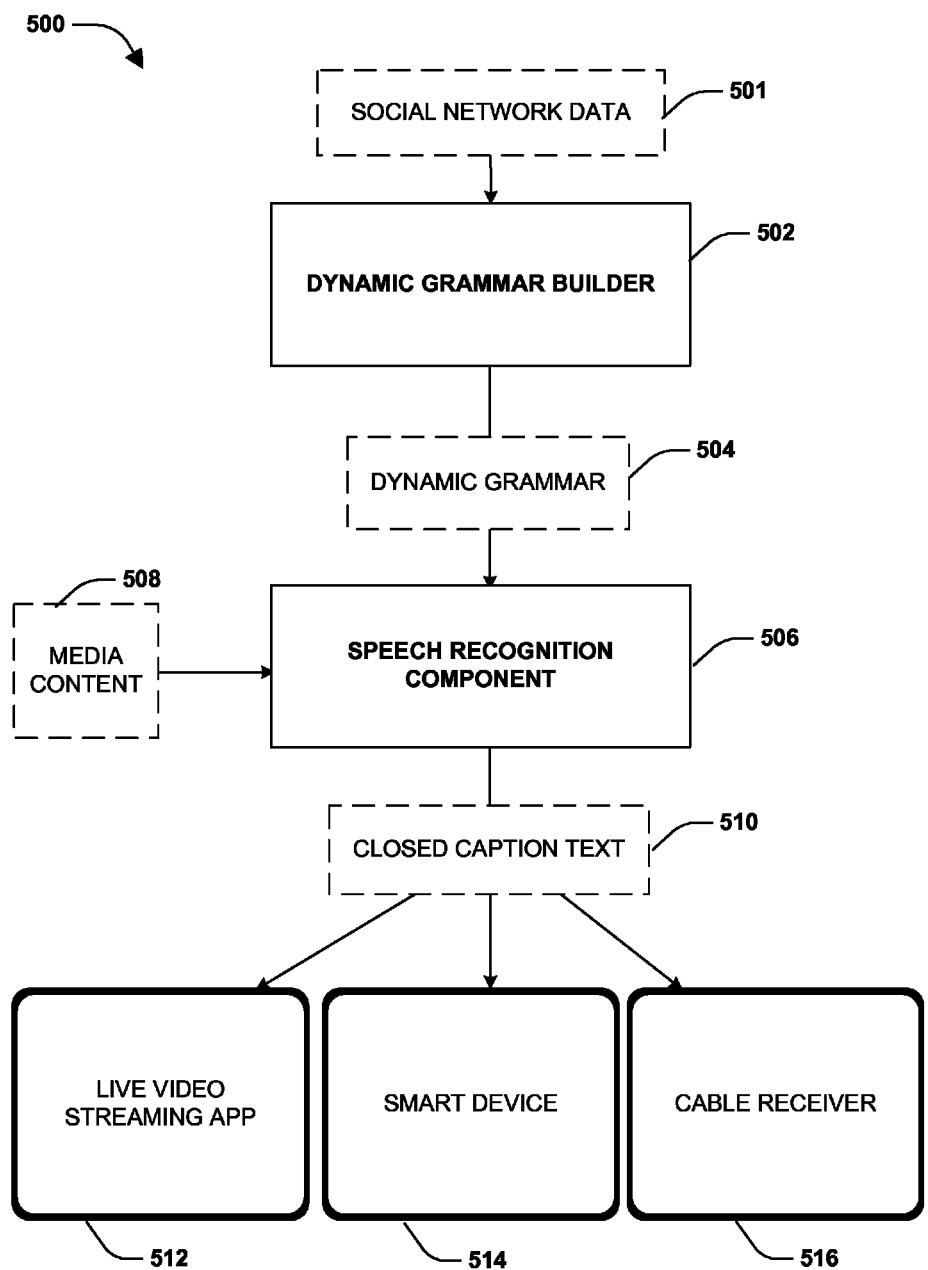
FIG. 5 is a component block diagram illustrating an exemplary system for automated closed captioning for media content, where closed caption text is provided to a live video streaming app, a smart device, and a cable receiver.

FIG. 5 illustrates an example of a system 500 for automated closed captioning for media content 508. The system 500 comprises a dynamic grammar builder 502 and/or a speech recognition component 506. The dynamic grammar builder 502 may access social network data 501 occurring within a threshold timespan of a broadcast of media content 508 (e.g., a live broadcast of an interview). The dynamic grammar builder 502 may build a dynamic grammar 504 based upon named entities occurring and/or trending within the social network data 501. The speech recognition component 506 may perform speech recognition upon the media content 508 utilizing the dynamic grammar 504 to create closed caption text 510 for the media content 508. The closed caption text 510 may be displayed through a live video streaming app 512, a smart device 514, a cable receiver 516, and/or other devices and interfaces used to display the media content 508.

According to an aspect of the instant disclosure, a system for automated closed captioning for media content is provided. The system comprises a dynamic grammar builder and a speech recognition component. The dynamic grammar builder is configured to access real-time content occurring within a threshold timespan of a broadcast of media content. The dynamic grammar builder is configured to generate a list of named entities occurring within the real-time content. The dynamic grammar builder is configured to identify trending named entities within the list of named entities. The dynamic grammar builder is configured to rank the list of named entities based upon the trending named entities to create a ranked list of named entities. The dynamic grammar builder is configured to build a dynamic grammar based upon the ranked list of named entities. The speech recognition component is configured to perform speech recognition upon the broadcast of media content utilizing the dynamic grammar to create closed caption text for the broadcast of media content.

According to an aspect of the instant disclosure, a method for automated closed captioning for media content is provided. The method includes accessing social network data occurring within a threshold timespan of a broadcast of media content. The method includes generating a list of named entities occurring within the social network data. The method includes identifying trending named entities within the list of named entities. The method includes ranking the list of named entities based upon the trending named entities to create a ranked list of named entities. The method includes building a dynamic grammar based upon the ranked list of named entities. The method includes performing speech recognition upon the broadcast of media content utilizing the dynamic grammar to create closed caption text for the broadcast of media content.

According to an aspect of the instant disclosure, a computer readable medium comprising instructions which when executed performs a method for automated closed captioning for media content is provided. The method comprises accessing real-time content occurring within a threshold timespan of a broadcast of media content. The method comprises generating a list of named entities occurring within the real-time content. The method comprises identifying trending named entities within the list of named entities. The method comprises ranking the list of named entities based upon the trending named entities to create a ranked list of named entities. The method comprises building a dynamic grammar based upon the ranked list of named entities. The method comprises utilizing the dynamic grammar for correcting user generated closed captioning for the broadcast of media content.

According to an aspect of the instant disclosure, a means for automated closed captioning for media content is provided. Real-time content, occurring within a threshold timespan of a broadcast of media content, is accessed, by the means for automated closed captioning. A list of named entities, occurring within the real-time content, is generated, by the means for automated closed captioning. Trending named entities, within the list of named entities, are identified, by the means for automated closed captioning. The list of named entities is ranked based upon the trending named entities to create a ranked list of named entities, by the means for automated closed captioning. A dynamic grammar is built based upon the ranked list of named entities, by the means for automated closed captioning. The dynamic grammar is utilized for at least one of creating closed caption text for the broadcast of media content or correcting user generated closed captioning for the broadcast of media content, by the means for automated closed captioning.

According to an aspect of the instant disclosure, a means for automated closed captioning for media content is provided. Social network data, occurring within a threshold timespan of a broadcast of media content, is accessed, by the means for automated closed captioning. A list of named entities, occurring within the social network data, is generated, by the means for automated closed captioning. Trending named entities, within the list of named entities, are identified, by the means for automated closed captioning. The list of named entities is ranked based upon the trending named entities to create a ranked list of named entities, by the means for automated closed captioning. A dynamic grammar is built based upon the ranked list of named entities, by the means for automated closed captioning. Speech recognition is performed upon the broadcast of media content utilizing the dynamic grammar to create closed caption text for the broadcast of media content, by the means for automated closed captioning.

Figure 6:
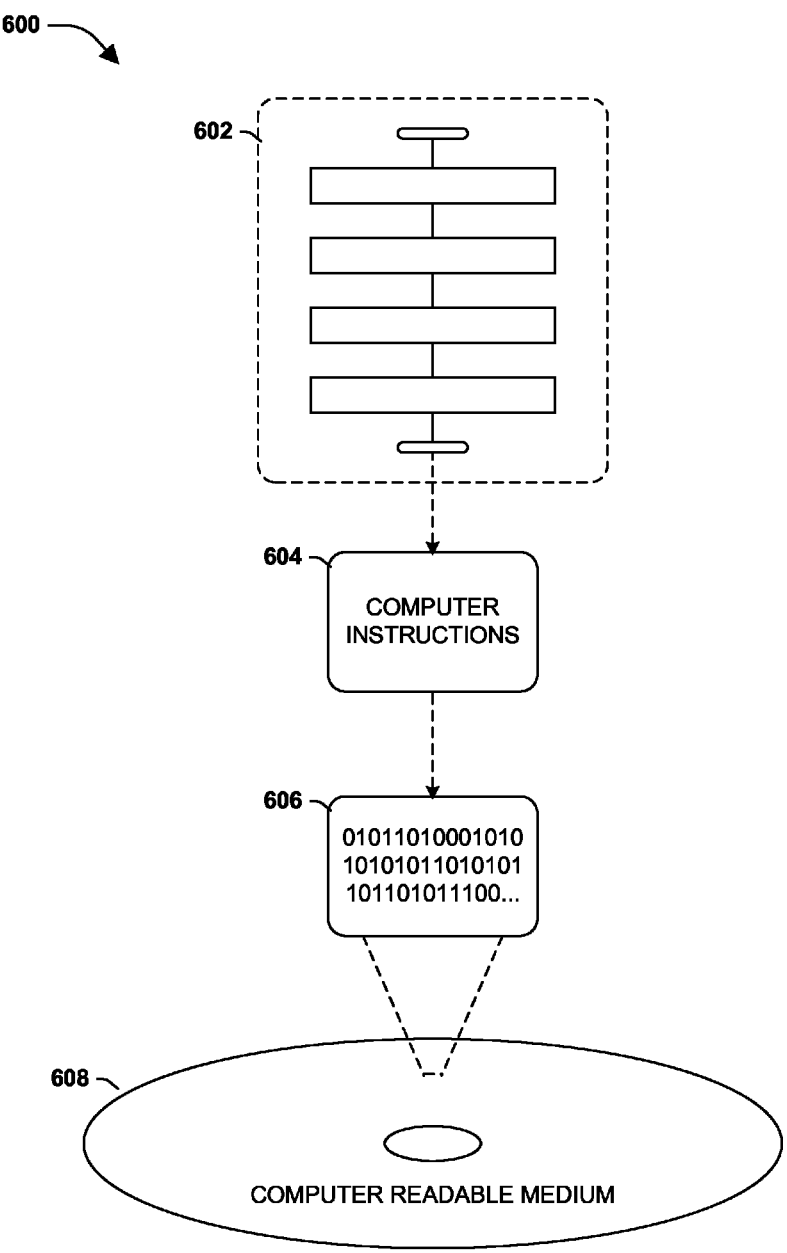
FIG. 6 is an illustration of an exemplary computer readable medium wherein processor-executable instructions configured to embody one or more of the provisions set forth herein may be comprised.

Still another embodiment involves a computer-readable medium comprising processor-executable instructions configured to implement one or more of the techniques presented herein. An example embodiment of a computer-readable medium or a computer-readable device is illustrated in FIG. 6, wherein the implementation 600 comprises a computer-readable medium 608, such as a CD-R, DVD-R, flash drive, a platter of a hard disk drive, etc., on which is encoded computer-readable data 606. This computer-readable data 606, such as binary data comprising at least one of a zero or a one, in turn comprises a set of computer instructions 604 configured to operate according to one or more of the principles set forth herein. In some embodiments, the processor-executable computer instructions 604 are configured to perform a method 602, such as at least some of the exemplary method 100 of FIG. 1, for example. In some embodiments, the processor-executable instructions 604 are configured to implement a system, such as at least some of the exemplary system 200 of FIGS. 2A-2B, at least some of the exemplary system 300 of FIG. 3, at least some of the exemplary system 400 of FIG. 4, and/or at least some of the exemplary system 500 of FIG. 5, for example. Many such computer-readable media are devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

As used in this application, the terms "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Figure 7:
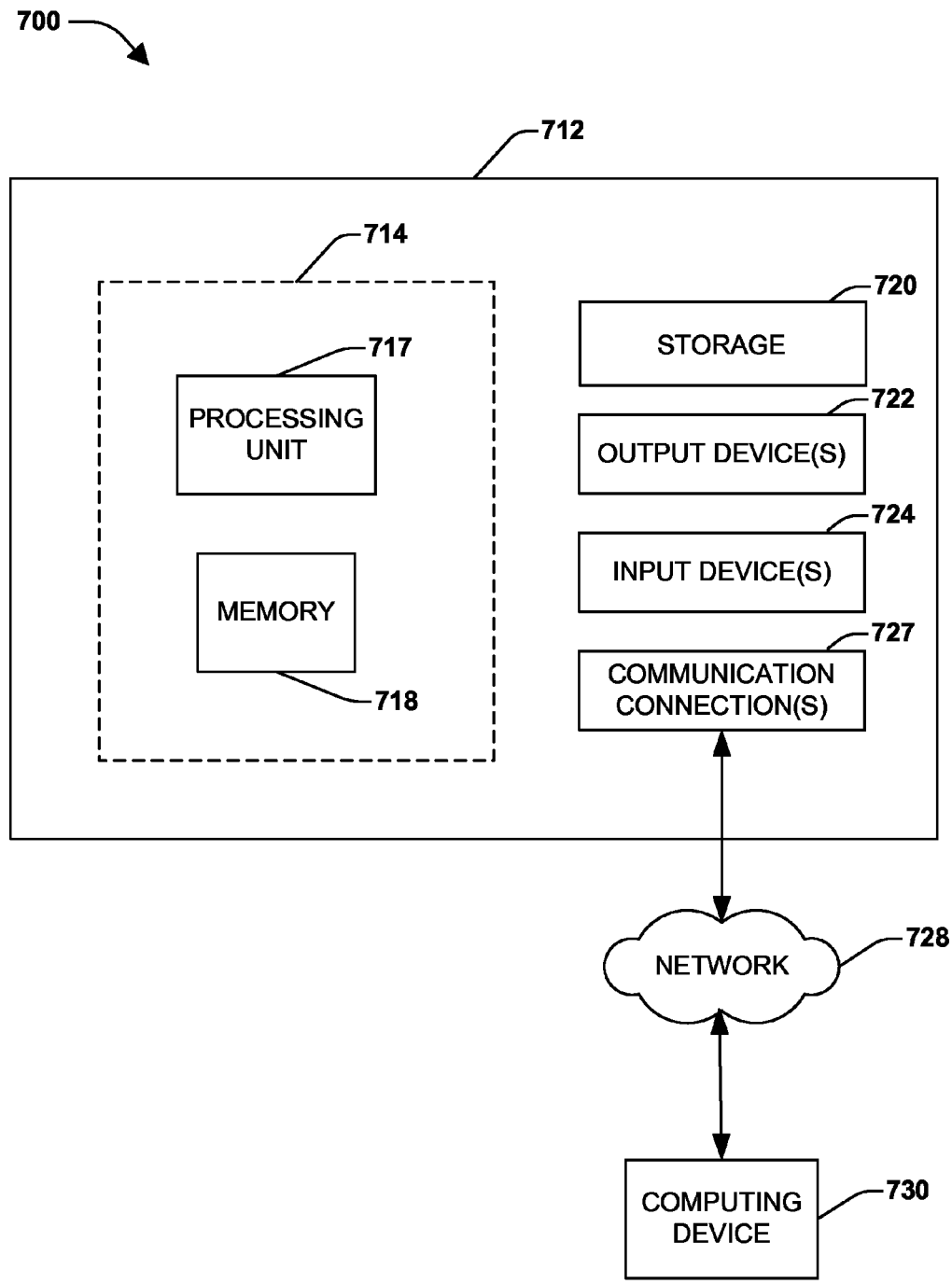
FIG. 7 illustrates an exemplary computing environment wherein one or more of the provisions set forth herein may be implemented.

FIG. 7 and the following discussion provide a brief, general description of a suitable computing environment to implement embodiments of one or more of the provisions set forth herein. The operating environment of FIG. 7 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 7 illustrates an example of a system 700 comprising a computing device 712 configured to implement one or more embodiments provided herein. In one configuration, computing device 712 includes at least one processing unit 716 and memory 718. Depending on the exact configuration and type of computing device, memory 718 may be volatile (such as RAM, for example), non-volatile (such as ROM, flash memory, etc., for example) or some combination of the two. This configuration is illustrated in FIG. 7 by dashed line 714.

In other embodiments, device 712 may include additional features and/or functionality. For example, device 712 may also include additional storage (e.g., removable and/or non-removable) including, but not limited to, magnetic storage, optical storage, and the like. Such additional storage is illustrated in FIG. 7 by storage 720. In one embodiment, computer readable instructions to implement one or more embodiments provided herein may be in storage 720. Storage 720 may also store other computer readable instructions to implement an operating system, an application program, and the like. Computer readable instructions may be loaded in memory 718 for execution by processing unit 716, for example.

The term "computer readable media" as used herein includes computer storage media. Computer storage media includes volatile and nonvolatile, removable and non-removable media implemented in any method or technology for storage of information such as computer readable instructions or other data. Memory 718 and storage 720 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 712. Computer storage media does not, however, include propagated signals. Rather, computer storage media excludes propagated signals. Any such computer storage media may be part of device 712.

Device 712 may also include communication connection(s) 726 that allows device 712 to communicate with other devices. Communication connection(s) 726 may include, but is not limited to, a modem, a Network Interface Card (NIC), an integrated network interface, a radio frequency transmitter/receiver, an infrared port, a USB connection, or other interfaces for connecting computing device 712 to other computing devices. Communication connection(s) 726 may include a wired connection or a wireless connection. Communication connection(s) 726 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 712 may include input device(s) 724 such as keyboard, mouse, pen, voice input device, touch input device, infrared cameras, video input devices, and/or any other input device. Output device(s) 722 such as one or more displays, speakers, printers, and/or any other output device may also be included in device 712. Input device(s) 724 and output device(s) 722 may be connected to device 712 via a wired connection, wireless connection, or any combination thereof. In one embodiment, an input device or an output device from another computing device may be used as input device(s) 724 or output device(s) 722 for computing device 712.

Components of computing device 712 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 712 may be interconnected by a network. For example, memory 718 may be comprised of multiple physical memory units located in different physical locations interconnected by a network.

Those skilled in the art will realize that storage devices utilized to store computer readable instructions may be distributed across a network. For example, a computing device 730 accessible via a network 728 may store computer readable instructions to implement one or more embodiments provided herein. Computing device 712 may access computing device 730 and download a part or all of the computer readable instructions for execution. Alternatively, computing device 712 may download pieces of the computer readable instructions, as needed, or some instructions may be executed at computing device 712 and some at computing device 730.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Further, unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "exemplary" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B and/or both A and B. Furthermore, to the extent that "includes", "having", "has", "with", and/or variants thereof are used in either the detailed description or the claims, such terms are intended to be inclusive in a manner similar to the term "comprising".

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A system for increasing accuracy of computer speech recognition comprising:
   a dynamic grammar builder computing device comprising one or more processing units and one or more computer-readable media comprising computer-executable instructions which, when executed by the one or more processing units, cause the dynamic grammar builder computing device to:
   obtain social network data occurring within a threshold timespan of a broadcast of media content;
   identify named entities from the obtained social network data that are trending within the obtained social network data;
   rank the identified named entities based upon the trending; and
   build a dynamic grammar comprising at least some of the named entities based upon the ranking; and
   a speech recognition computing device comprising one or more processing units and one or more computer-readable media comprising computer-executable instructions which, when executed by the one or more processing units, cause the speech recognition computing device to:
   perform speech recognition of spoken words, spoken by the broadcast of the media content, utilizing the dynamic grammar to create closed caption text for the broadcast of the media content.

2. The system of claim 1, wherein the computer-readable media of the dynamic grammar builder computing device comprise additional computer-executable instructions which, when executed by the one or more processing units of the dynamic grammar builder computing device cause the dynamic grammar builder computing device to:
   access supplemental content associated with at least one of the named entities;
   identify a context associated with the at least one of the named entities or with an event occurring within the media content; and
   build the dynamic grammar based upon the identified context.

3. The system of claim 1, wherein the trending comprises occurrence metrics identifying a number of times a particular named entity is referenced in the obtained social network data within trending timespan thresholds.

4. The system of claim 1, wherein the identifying the named entities comprises executing entity recognition functionality upon the social network data.

5. The system of claim 1, wherein the ranking comprises responsive to a refresh timer expiring, re-ranking the named entities based upon the trending within updated social network data.

6. The system of claim 1, wherein the computer-readable media of the dynamic grammar builder computing device comprise additional computer-executable instructions which, when executed by the one or more processing units of the dynamic grammar builder computing device cause the dynamic grammar builder computing device to:
   define the threshold timespan based upon a type of event occurring within the media content.

7. A computing device comprising:
   one or more processing units; and
   one or more computer-readable media comprising computer-executable instructions which, when executed by the one or more processing units, cause the computing device to:
   obtain real-time content occurring within a threshold timespan of a broadcast of media content;
   identify named entities from the obtained real-time content that are trending within the obtained real-time content;
   ranking the identified named entities based upon the trending;
   building a dynamic grammar comprising at least some of the named entities based upon the ranking; and
   utilizing the dynamic grammar for correcting user generated closed captioning for the broadcast of the media content.

8. A method for increasing accuracy of computer speech recognition comprising:
   obtaining, by a computing device, social network data occurring within a threshold timespan of a broadcast of media content;
   identifying, on the computing device, named entities from the obtained social network data that are trending within the obtained social network data;
   ranking, on the computing device, the identified named entities based upon the trending;
   building, on the computing device, a dynamic grammar comprising at least some of the named entities based upon the ranking; and
   performing computer speech recognition of spoken words, spoken by the broadcast of the media content, utilizing the dynamic grammar to create closed caption text for the broadcast of the media content.

9. The method of claim 8, further comprising:
   accessing, by the computing device, supplemental content associated with at least one of the named entities;
   identifying, with the computing device, a context associated with either the at least one of the named entities or with an event occurring within the media content; and building the dynamic grammar based upon the identified context.

10. The method of claim 8, wherein the trending comprises occurrence metrics identifying a number of times a particular named entity is referenced in the obtained social network data within trending timespan thresholds.

11. The method of claim 8, wherein the identifying the named entities comprises:
   executing entity recognition functionality upon the social network data.

12. The method of claim 8, wherein the ranking comprises:
   responsive to a refresh timer expiring, re-ranking the named entities based upon the trending within updated social network data.

13. The method of claim 8, further comprising:
   defining the threshold timespan based upon a type of event occurring within the media content.

14. The method of claim 8, wherein the media content is one of a live interview, a live telecast, or an online videogame.

15. The method of claim 8, wherein the dynamic grammar is:
   a speech recognition grammar specification file.

16. The method of claim 8, the social network data comprises at least one of a query log, a message, a microblog, a forum post, or user created data that is updated in real-time.

17. The method of claim 8, wherein the performing the speech recognition comprises:
   loading the dynamic grammar into memory of a speech recognition server; and
   invoking speech recognition functionality, of the speech recognition server, to utilize the dynamic grammar as a library against which an audio fragment, of the broadcast of the media content, is compared for determining a probability that the audio fragment is a named entity.

18. The method of claim 8, further comprising:
   correcting user generated closed captioning for the broadcast of the media content based upon the dynamic grammar.

19. The method of claim 8, wherein the performing speech recognition comprises:
   utilizing the dynamic grammar to either increase, or decrease a probability that an audio fragment, of the broadcast of the media content, is a named entity.

20. The method of claim 8, further comprising:
   filtering the social network data based upon a context of an event occurring within the media content.

\* \* \* \* \*